Figure 1:
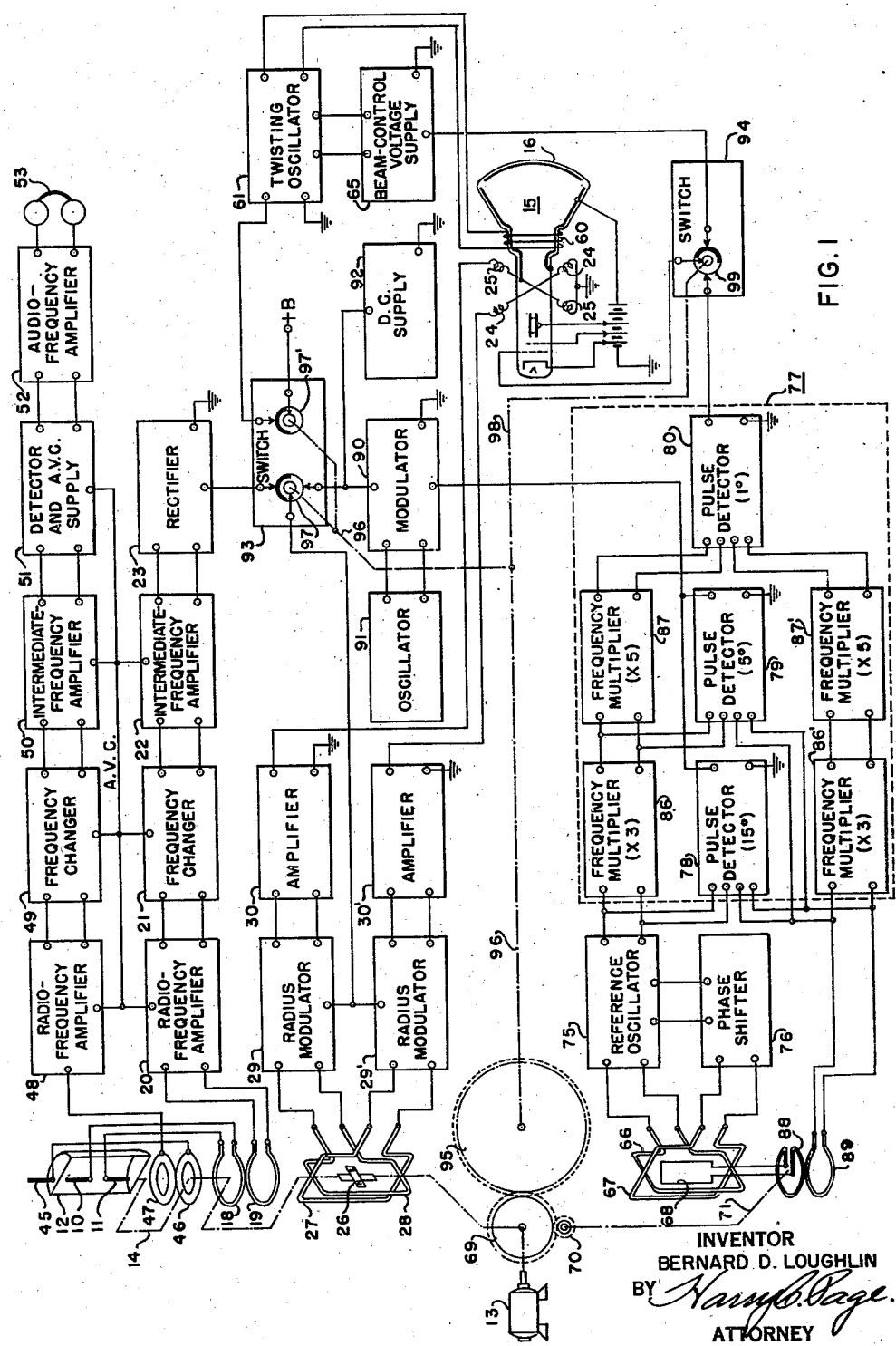

Dec. 2, 1947.  B. D. LOUGHLIN  2,432,026
POSITION-INDICATING ARRANGEMENT
Filed Sept. 20, 1943  2 Sheets—Sheet 1

INVENTOR
BERNARD D. LOUGHLIN
BY Harry C. Page
ATTORNEY

Dec. 2, 1947.                B. D. LOUGHLIN                2,432,026
POSITION-INDICATING ARRANGEMENT
Filed Sept. 20, 1943                2 Sheets—Sheet 2
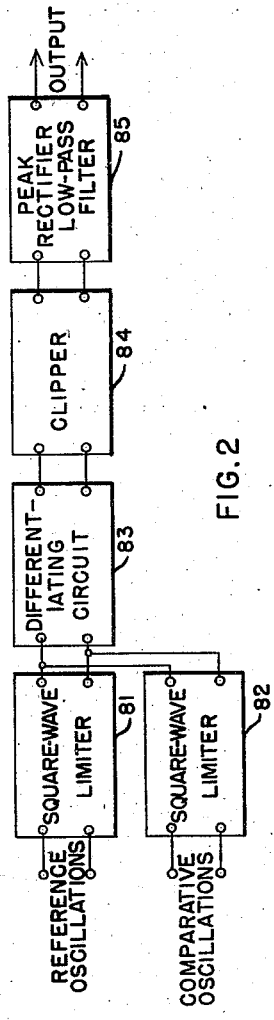
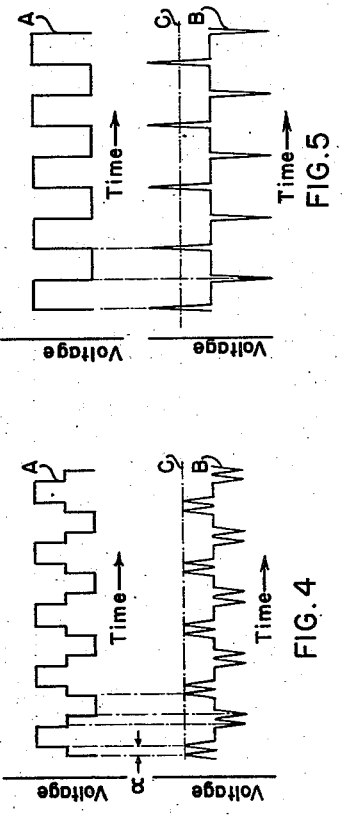
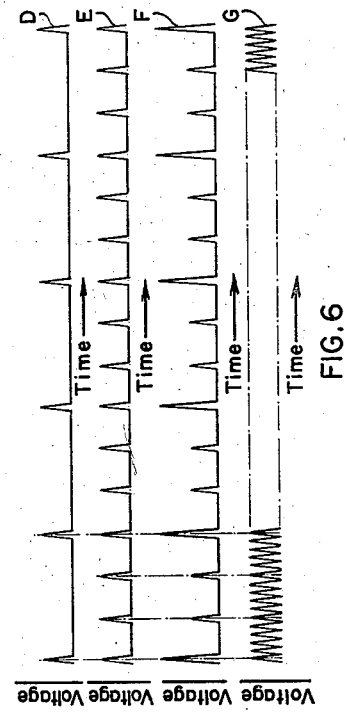
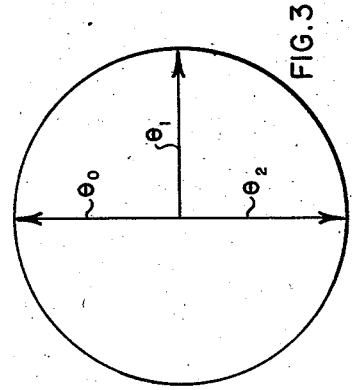
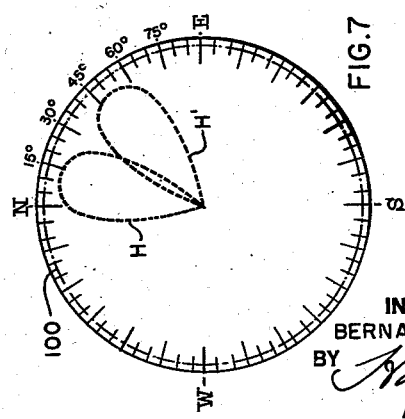
INVENTOR
BERNARD D. LOUGHLIN
BY
ATTORNEY Patented Dec. 2, 1947

2,432,026

UNITED STATES PATENT OFFICE 2,432,026

POSITION-INDICATING ARRANGEMENT

Bernard D. Loughlin, Bayside, N. Y., assignor, by mesne assignments, to Hazeltine Research, Inc., Chicago, Ill., a corporation of Illinois Application September 20, 1943, Serial No. 503,070

15 Claims. (Cl. 250—11)

1

This invention relates, in general, to an arrangement for indicating the position of a reference characteristic movable in a predetermined pattern. While the invention is subject to a wide range of applications, it is especially suited for use in a radiated-signal direction finder for indicating the position of a movable directive pattern and will be described in that connection.

A direction finder for producing an unambiguous indication of the direction of reception, or bearing, of a radiated signal may comprise a pick-up system having a directive pattern, means for causing the directive pattern of the pick-up system to rotate, a line-tracing device, means for synchronizing the line-tracing device with the rotation of the directive pattern, and means responsive to the amplitude of a radiated signal received by the pick-up system for shifting the line traced by the device in accordance therewith to trace the directive pattern of the pick-up system with reference to the direction of reception of the received signal. It is preferable to utilize a cathode-ray tube as the line-tracing device in such an arrangement and, in order to obtain a direct reading of the bearing of a received signal, it has been proposed to associate a mechanical compass scale with the viewing screen of the tube. The described arrangement has the limitation that the mechanical compass scale requires frequent adjustment if the direction indications are to be maintained in proper orientation with reference to the rotating directive pattern, which is a necessary operating criterion. For example, it will be apparent that such a scale requires adjustment each time the cathode-ray tube is replaced or shifted, or if the beam thereof becomes decentered.

In an effort to avoid the limitations inherent in the use of a mechanical compass scale in a direction finder of the general type under consideration, it has been proposed to utilize a master oscillator and to derive therefrom signals necessary for causing the rotation of the directive pattern of the pick-up system, as well as marker signals for providing direction indications on the screen of the cathode-ray tube. Such an arrangement, however, is subject to the limitation that the direction indications are not necessarily maintained in proper orientation with reference to the rotation of the directive pattern. This is true because the arrangement for deriving the direction indications is not synchronized directly from the rotation of the directive pattern and thus does not necessarily produce direction indications which are strictly accurate.

2

It is, therefore, an object of the invention to provide an improved arrangement for indicating the position of a reference characteristic movable in a predetermined pattern and which is not subject to the above-mentioned limitations of prior art arrangements.

It is another object of the invention to provide an improved arrangement for indicating the position of a reference characteristic movable in a predetermined pattern in which the produced indication is dependent directly upon the movement of the reference characteristic.

It is a specific object of the invention to provide, in a radiated-signal direction finder, an improved arrangement for indicating the position of a movable directive pattern.

In accordance with the invention there is provided, in a radiated-signal direction finder, an arrangement for indicating the position of a movable directive pattern comprising, a signal-radiation system having a directive pattern in space and including means for mechanically rotating at least a portion of the system to rotate its directive pattern. The arrangement has means for supplying oscillations, and means including a rotatable element mechanically coupled to the first-mentioned means to be mechanically driven thereby for varying a characteristic of the oscillations in accordance with the position of the directive pattern in space. Means are provided for deriving from the resulting variation of the oscillations a marker signal which represents a predetermined position of the directive pattern in space. There is also provided a line-tracing device, means for synchronizing the line-tracing device with the rotation of the directive pattern, and means for applying the marker signal to the device to produce an indication of the aforesaid predetermined position of the directive pattern. The arrangement additionally has means responsive to a radiated signal translated by the system for causing the device to produce an indication of the directive pattern with reference to the aforesaid predetermined position, thereby to indicate the direction of reception of the radiated signal.

Also, in accordance with the invention, an arrangement for indicating the position of a reference characteristic movable in a predetermined pattern comprises means for supplying reference oscillations, and means dependent directly upon the movement of the reference characteristic for varying the phase of the reference oscillations in accordance therewith at a frequency which is integrally related to the frequency of movement of the reference characteristic to derive comparative oscillations. The arrangement also includes means for deriving from the comparative oscillations a succession of marker signals which individually represent different predetermined positions of the reference characteristic. Indications are obtained from a line-tracing device, means for synchronizing the line-tracing device with the movement of the reference characteristic, and means for applying the succession of marker signals to the device to provide scale divisions corresponding to the aforesaid predetermined positions. Finally, the arrangement has means for translating a signal dependent upon the position of the reference characteristic, and means for causing the device to indicate with respect to the scale the variation of the last-named signal in response to the motion of the reference characteristic.

For a better understanding of the present invention, together with other and further objects thereof, reference is had to the following description taken in connection with the accompanying drawings, and its scope will be pointed out in the appended claims.

Referring to the drawings, Fig. 1 is a schematic circuit diagram of a radiated-signal direction finder including an arrangement in accordance with the invention for indicating the position of a reference characteristic movable in a predetermined pattern; Fig. 2 is a schematic diagram of a portion of the indicating arrangement disclosed in Fig. 1; while Figs. 3–7, inclusive, comprise graphs utilized in explaining the operation of the position-indicating arrangement included in Fig. 1.

Referring now more particularly to Fig. 1 of the drawings, the radiated-signal direction finder there illustrated includes an arrangement, in accordance with the invention, for indicating the position of a movable directive pattern. The direction finder comprises a signal-radiation system including a pick-up, or antenna, system having a directive pattern in space. As shown, the pick-up system consists of a vertical dipole antenna 10, 11 and an associated reflector 12 having such characteristics as to give the antenna the desired directive pattern. A driver or motor 13 is mechanically coupled to antenna system 10, 11 and its associated reflector 12, as indicated by the broken line 14, and constitutes means for rotating the antenna system, thereby effectively to rotate its directive pattern. The signal output of antenna system 10, 11 is coupled to a receiving system through a pair of inductively-coupled loops 18 and 19, loop 19 being stationary and loop 18 being driven with the antenna system, as indicated by broken line 14. The receiving system comprises, in cascade, a radio-frequency amplifier 20 of one or more stages, a frequency changer or oscillator-modulator 21, an intermediate-frequency amplifier 22 of one or more stages, and a rectifier 23.

The direction finder also includes a line-tracing device comprising a cathode-ray tube 15 having means for producing an electron beam and deflecting means for causing the electron beam to trace a line on a target, such as a fluorescent screen 16. The deflecting means includes a pair of windings 24, 24 and 25, 25 of conventional form. The deflecting windings are energized by signals, described hereinafter, of such wave form as to cause the electron beam of the tube normally to traverse a circle on screen 16.

The arrangement also comprises means for synchronizing the line-tracing device, or the rotation of the beam of cathode-ray tube 15, with the rotation of the directive pattern of antenna system 10, 11. This means includes a permanent magnet 26 rotated with the antenna system as indicated by broken line 14 within a pair of stationary signal-output windings 27 and 28 arranged in mutually perpendicular planes, that is, in a space-quadrature relation. The signals developed in windings 27 and 28 are applied, respectively, to deflecting windings 24, 24 and 25, 25 through radius-modulators 29' and 29 and amplifiers 30' and 30 to control the beam of cathode-ray tube 15.

The signal output of rectifier 23 is also applied to radius-modulators 29 and 29' through a switch 93, described hereinafter, to modulate the energizing signals for deflecting windings 24, 24 and 25, 25 in accordance with a radiated signal translated by the receiving system described above. Thus, the radius-modulators comprise means responsive to a radiated signal translated by the system for causing the indicating device to produce an indication of the directive pattern of the antenna system.

To facilitate obtaining accurate bearing indications, the direction finder includes an arrangement for cyclically displacing the line traced by the beam of the cathode-ray tube 15 to produce on screen 16 a pair of overlapping patterns whose intersections sharply indicate the bearing of a received signal. This arrangement comprises a winding 60 disposed about the neck portion of tube 15 and excited by a twisting oscillator 61, a sine-wave oscillator having a frequency which is high with reference to the frequency of antenna rotation. A beam-control voltage supply 65 is coupled to oscillator 61 to develop positive voltage pulses for application to the control electrode of cathode-ray tube 15 by way of a switch 94, described more fully hereinafter. The voltage pulses developed by supply 65 have a frequency which is twice that of oscillator 61 and are so applied to the control electrode of tube 15 as to bias the tube above cutoff at intervals when winding 60 causes the electron beam to have its maximum displacement.

Since the antenna system 10, 11 has a directive pattern, the orientation of which varies with reference to the direction of reception of a radiated signal, the amplitude of the signal translated by units 20–23, inclusive, varies in accordance with this relative orientation and also in accordance with the average field strength of the radiated signal being received. In order substantially to eliminate undesirable amplitude variations of the received signal with variations of the average field strength thereof, a control system is provided for the above-described receiver. This control system comprises a second antenna system 45, which is preferably nondirective, and means coupled thereto for deriving a control effect which varies primarily in accordance with the average field strength of a received radiated signal. As illustrated, antenna 45 comprises a vertical conductor mounted on reflector 12 and adapted to be rotated therewith. A separate receiver capacitively coupled to antenna 45 through a rotating plate 46 and a stationary plate 47. This last-named receiver comprises, in cascade, a radio-frequency amplifier 48 of one or more stages, a frequency changer or oscillator-modulator 49, an intermediate-frequency amplifier 50 of one or more stages, a detector and automatic volume control or A. V. C. supply 51, an audio-frequency amplifier 52 of one or more stages, and a signal-reproducing device 53. A voltage from the A. V. C. rectifier in unit 51 is applied to one or more of the tubes of stages 48, 49 and 50 to maintain the amplitude of the signal input to detector 51 within a relatively narrow range for a wide range of variations of the average field strength of the received radiated signal. Additionally, the A. V. C. rectifier in unit 51 is utilized to control the gain of one or more of the stages 20, 21 and 22 to maintain the amplitude of the signal input to rectifier 23 within a relatively narrow range for a wide range of variations of the average field strength of a radiated signal being received.

The aforedescribed direction finder is generally similar to that disclosed in application Serial No. 503,073, filed September 20, 1943, in the name of James F. Craib, and similar elements thereof are identified by like reference numerals. The operation of the direction finder is completely described in the above-identified application and reference may be had thereto for such complete description. In brief, the operation is as follows: Motor 13, in rotating antenna system 10, 11 causes magnet 26 to be rotated in synchronism therewith, whereby signals of sinusoidal wave form are induced in windings 27 and 28. Due to the space-quadrature relationship of these windings, the signals induced therein have a time-phase displacement of 90 degrees with relation to one another and are effective to cause the beam of tube 15 to trace a circular line in synchronism with the antenna rotation. A radiated signal intercepted by antenna system 10, 11 during such rotation is translated through the receiving system comprised of units 20-23, inclusive. An output signal is derived from rectifier 23 thereof having amplitude variations which represent the directive pattern of the antenna system with reference to the direction of reception of the radiated signal. This output signal is applied to radius-modulators 29, 29' to modulate the exciting signals for deflecting windings 24, 24 and 25, 25 so as to shift the line traced by the cathode-ray beam of tube 15 in accordance therewith to trace the directive pattern of the antenna on the screen 16. While this directive pattern is being traced, winding 60 and its associated circuits are effective periodically to shift angularly the line traced by the device at a frequency which is high with reference to the antenna rotation, whereby the overlapping directive patterns H, H' of Fig. 7 are produced on screen 16. The intersections of these patterns with reference to indications on the screen of predetermined positions of the directive pattern sharply determine the direction of reception, or bearing, of the received signal.

Having considered the elements utilized in producing on screen 16 an indication of the received radiated signal, reference is now made to the arrangement, in accordance with the invention, for indicating thereon a predetermined reference position of the rotating directive pattern, or a scale, for accurately determining the bearing of the received signal. This arrangement includes means dependent directly upon the rotation of the directive pattern for deriving a marker signal, or a succession of marker signals, which individually represent different predetermined positions of the directive pattern. More specifically, this means comprises impedance-coupling means including a primary element having at least two impedance members arranged in space-quadrature relation and a secondary element and means for rotating one of the aforesaid elements in synchronism with the rotation of the directive pattern. In the preferred embodiment of the invention, as illustrated in Fig. 1, an inductive-coupling means is provided which includes a primary element having two windings 66 and 67 arranged in mutually perpendicular planes. This means also includes a secondary element consisting of a winding 68 disposed for rotation within windings 66 67. The secondary winding is mechanically coupled with antenna system 10, 11 for rotation therewith, as represented by the gear train 69, 70 driven by motor 13. The gear train is so selected that winding 68 rotates at a frequency which is twenty-four times that of the antenna rotation.

The system also includes means, such as a reference oscillator 75, for supplying reference oscillations, preferably having a sinusoidal wave form and a frequency which is high with reference to the frequency of rotation of secondary winding 68. Winding 66 is directly coupled with oscillator 75 while winding 67 is coupled thereto through a 90-degree phase shifter 76, whereby the oscillations as applied to the individual windings 66, 67 have a quadrature-phase relation. As secondary winding 68 is rotated, comparative oscillations are induced therein having a phase relation with respect to the reference oscillations which varies continuously and directly in accordance with the position of the primary and secondary elements of the inductive-coupling means and, therefore, directly in accordance with the position of the antenna and its directive pattern.

The arrangement also includes means for deriving from the comparative oscillations induced in winding 68 the aforementioned marker signals or succession of marker signals. This means, which is indicated generally as 77, comprises a pulse detector 78 for comparing the reference and comparative oscillations to derive a single marker signal at each interval when these oscillations have a predetermined phase relation, such as substantially identical phase. One input circuit of the detector is coupled directly to reference oscillator 75 while another input circuit thereof is coupled to secondary winding 68 through inductively-coupled loops 88 and 89, loop 89 being stationary and loop 88 rotating with the secondary winding 68, as indicated by broken line 71.

It will be appreciated that, if the frequencies of both the reference and comparative oscillations are multiplied by some factor, such as $n$, then the relative phase of the multiplied reference and comparative oscillations varies $n$ times as fast as that of the original oscillations. By comparing the multiplied-frequency oscillations, a succession of marker signals may be derived having a repetition frequency which is $n$ times the repetition frequency of like signals derived from a comparison of the original reference and comparative oscillations. Actually, it is only necessary to multiply the frequency of one, say, the reference oscillations, and compare the other thereto in order to obtain marker signals of a higher repetition frequency.

This effect is utilized in the present invention to provide a vernier indication scale on the screen of cathode-ray tube 15. For this purpose, unit 77 includes frequency multipliers 86 and 87 connected in cascade to reference oscillator 75 for multiplying the frequency of the reference oscillations successively by the factors 3 and 5, respectively. Also, frequency multipliers 86' and 87' are provided, connected in cascade to loop 89, for similarly multiplying the frequency of the comparative oscillations. Further, unit 77 includes additional pulse detectors 79 and 80. Detector 79 has one input circuit coupled to frequency multiplier 86 and a second input circuit coupled to loop 89. Detector 80 has input circuits individually coupled to frequency multipliers 87 and 87'.

Detectors 78-80, inclusive, are substantially identical in construction and, as illustrated in Fig. 2, each comprises square-wave limiters 81 and 82 which receive the reference and comparative oscillations, respectively, and shape these oscillations into signals of square-wave form by way of symmetrical limiting. Coupled in cascade to the output circuits of the square-wave limiters are a differentiating circuit 83, a clipper 84, and a peak rectifier and low-pass filter 85 which derive the desired marker signals in a manner described fully hereinafter.

The individual components of the described detectors may be of any well-known design and construction. For example, each of units 81 and 82 may be generally similar to unit 15 of United States Letters Patent 2,271,203, issued to Jasper J. Okrent on January 27, 1942. Differentiating circuit 83 may be similar to unit 20 of United States Letters Patent 2,198,969, issued to Harold M. Lewis on April 30, 1940. Clipper 84 may comprise an amplifier biased in a manner similar to that of limiter 24 of application Serial No. 262,146, filed March 16, 1939, in the name of John C. Wilson. The peak rectifier of unit 85 may comprise a diode rectifier included in a circuit arrangement generally similar to that associated with rectifier 21 of United States Letters Patent 2,240,490, issued to Madison Cawein on May 6, 1941, but modified to have its load circuit in the circuit of the cathode to facilitate obtaining an output signal of positive polarity. The low-pass filter of unit 85, coupled to the load circuit of the peak rectifier, may be similar to the filter provided by resistors 27 and condensers 28 of the aforementioned Lewis patent. The time constants of the rectifier load circuit and the filter circuit as utilized in the instant application are specifically defined hereinafter.

The arrangement under consideration also includes means for applying the marker signals derived in unit 77 to cathode-ray line-tracing device 15 to provide on the screen thereof scale divisions corresponding to different predetermined positions of the antenna directive pattern. This means comprises means responsive to a first succession of marker signals for shifting the line traced by the line-tracing device in accordance therewith to provide major scale divisions and means responsive to a second succession of marker signals for modulating the intensity of the cathode-ray beam in accordance therewith to provide minor scale divisions.

The first aforesaid means includes a modulator 90 having one input circuit to which high-frequency oscillations are supplied from an oscillator 91 and a second input circuit to which a first succession of marker signals is applied. This succession of signals comprises the combined signal outputs of pulse detectors 78 and 79. The output signal of modulator 90 is applied through switch 93 to radius-modulators 29, 29', thereby to modulate the exciting signals for deflecting windings 24, 24 and 25, 25 in such a way as to produce major scale divisions on screen 16 of cathode-ray tube 15. A positive unidirectional potential obtained from a direct current supply 92 is applied to radius-modulators 29, 29' along with the output signal of modulator 90 to increase the radius of the circle traced by the cathode-ray beam of tube 15 during intervals when marker signals are applied thereto so that the scale divisions appear close to the periphery of the screen.

The means for modulating the intensity of the cathode-ray beam of tube 15 to provide minor scale divisions comprises the control electrode of the tube to which a second succession of marker signals, derived from pulse detector 80, is applied through switch 94. As previously indicated, the cathode-ray beam is normally biased to cutoff but the applied marker signals have a positive polarity and energize the beam periodically for the purpose of applying the minor scale divisions.

Switches 93 and 94 provide means for causing the cathode-ray line-tracing device to respond alternately to the marker signals and to the output signal of rectifier 23 for predetermined cycles of rotation of the antenna directive pattern. While the switches may take any of a variety of forms, they are illustrated as rotary-type switches driven at half the speed of the rotating antenna 10, 11 through gear train 69, 95 and suitable shafts indicated by broken lines 96 and 98.

Switch 93 has two sections 97, 97' each of which has a conducting segment over one-half its periphery and an insulating segment over the opposite half. The periphery of section 97 is wiped by diametrically opposed brushes, one being connected to the output circuit of rectifier 23 and the other being connected to the output circuit of modulator 90. Thus, in the position shown in Fig. 1, the output circuit of rectifier 23 is interrupted at the switch section. A third brush, which continuously engages a central conductive portion of the switch section, applies the signals translated therethrough to the input circuits of radius-modulators 29 and 29'. Section 97' has one brush engaging its periphery which connects to twisting oscillator 64. The central brush of this section connects to a suitable source of space current indicated +B.

Switch 94 is generally similar to that just described, being driven in synchronism therewith as indicated by broken line 98. The single section of this switch is engaged by two diametrically opposed brushes, one of which connects to the output circuit of beam-control voltage supply 65, while the other connects to the output circuit of pulse detector 80. The central brush of this switch section applies signals translated therethrough to the control electrode of cathode-ray tube 15.

In considering the operation of the described arrangement for providing scale divisions on the screen of tube 15, it will be seen that the rotation of antenna system 10, 11 causes secondary winding 68 to rotate, thereby producing in this winding comparative oscillations having a phase relation with respect to the reference oscillations of oscillator 75 which varies directly in accordance with the rotation of the antenna and its directive pattern. This effect is illustrated by the vector diagram of Fig. 3 where the vector $\theta_0$ represents the comparative oscillations produced in the secondary winding when that winding lies wholly within the plane of primary winding 66. In this position the comparative oscillations are assumed to be in phase with the reference oscillations applied to winding 66. Vector $\theta_1$ indicates the phase of the comparative oscillations when the secondary winding has rotated 90 degrees and lies within the plane of primary winding 67. In this position the comparative oscillations are in phase with the oscillations applied to winding 67 and, hence, are 90 degrees out of phase with reference to the comparative oscillations indicated by vector $\theta_0$. Vector $\theta_2$ represents the phase of the comparative oscillations after a further 90-degree rotation of winding 68. In this position the winding again is in the plane of primary winding 66 but is reversed with respect to its initial position so that the comparative oscillations are 180 degrees out of phase with the applied reference oscillations. Thus, it will be apparent that the phase relation of the reference and comparative oscillations may be represented by a rotating vector, rotating at the frequency of the secondary winding. Expressed in other words, inductive-coupling means 66, 67, 68 is a modulator which phase modulates the signal output of oscillator 75 in accordance with the rotation of winding 68 and also, therefore, in accordance with the rotation of the antenna directive pattern. Hence, the instantaneous phase relation of the reference and comparative oscillations is an indication of the instantaneous positions of both the secondary winding 68 and the antenna directive pattern.

The pulse detectors of unit 77 are individually effective to compare the reference and comparative oscillations applied thereto to derive a single marker signal when the oscillations have substantially identical phase. This operation of each pulse detector is represented by the curves of Figs. 4 and 5. In Fig. 4, curve A represents the combined reference and comparative oscillations applied to differentiating circuit 83 from units 81, 82 at a time when these oscillations are out of phase by an amount indicated $\alpha$. Curve B represents the time derivative thereof obtained at the output terminals of the differentiating circuit and supplied to clipper 84. It will be observed that no components of curve B, for the assumed condition, exceed the clipping level of unit 84, indicated by broken line C, and consequently no marker signal is derived in the detector.

The curves of Fig. 5 correspond to those of Fig. 4 and represent the operation of the detectors when the reference and comparative oscillations have substantially identical phase. It will be apparent that for this condition a series of pulses is supplied from clipper 84 to the peak rectifier and low-pass filter 85. A series of pulses is applied to the peak rectifier, under the assumed conditions, since the frequency of the reference oscillations is high with reference to the rotation of secondary winding 68. The load circuit of the peak rectifier has a time constant which is long with reference to the repetition frequency of the applied pulses but short with respect to the interval between each series of applied pulses. Further, the time constant of the low-pass filter included in unit 85 is selected to integrate the signal developed in the load circuit of the peak rectifier, thereby to derive a single pulse of unidirectional potential from each such series of rectified pulses. Thus, each pulse detector is effective to derive a single marker signal each time during the rotation of winding 68 that the applied reference and comparative oscillations have substantially identical phase.

Curves D, E, and G of Fig. 6 represent the succession of marker signals derived in each of the pulse detectors of unit 77 in response to the rotation of antenna system 10, 11. Each pulse of these curves represents the single marker signal obtained in response to the peak rectification of the series of pulses applied to a particular detector at a given interval when the reference and comparative oscillations have substantially identical phase. In this connection it should be noted that the time scale of Figs. 4 and 5 has been greatly exaggerated with reference to the time scale of Fig. 6 to facilitate a clear representation of the signals obtained in units 83 and 84.

Referring now more particularly to the signal output of the individual pulse detectors included in unit 77, curve D of Fig. 6 represents that obtained in the output circuit of detector 78. Inasmuch as secondary winding 68 is rotated at twenty-four times the frequency of antenna rotation, the reference and comparative oscillations applied to detector 78 have substantially identical phase at each 15 degrees of antenna rotation. As a consequence, a succession of marker signals is derived in this detector, which signals individually represent different predetermined positions of the antenna directive pattern having a spacing of 15 rotational degrees. Pulse detector 79 receives the multiplied-frequency reference oscillations from unit 86 and effectively compares them with the original comparative oscillations from loop 89, thereby to derive a succession of marker signals represented by curve E. Since the multiplied-frequency reference oscillations have a frequency three times that of the original oscillations, the marker signals of curve E individually represent different predetermined positions of the antenna directive pattern having a 5-degree spacing. Both the reference and comparative oscillations, as applied to pulse detector 80, have been multiplied in frequency fifteen times so that the output signal of this detector comprises a succession of marker signals individually representing different predetermined positions of the directive pattern having a 1-degree spacing. The output signal of this detector is indicated by curve G.

In applying the derived marker signals to the cathode-ray tube, the signal outputs of detectors 78 and 79 are combined to supply a succession of marker signals to the input circuit of modulator 90, as represented by curve F of Fig. 6. With switch 93 in the position shown, the output signal of modulator 90 is applied to radius-modulators 29, 29' to deflect the cathode-ray beam of tube 15 radially at a rapid rate at intervals corresponding to every 5 degrees of rotation of the antenna directive pattern. A maximum radial deflection of the beam is obtained at intervals corresponding to every 15 degrees of such rotation since the signal input to modulator 90 from detectors 78, 79 has a maximum amplitude at such intervals. Thus, major scale divisions are provided on screen 16 which individually correspond to different predetermined positions of the antenna directive pattern having a spacing of 5 rotational degrees.

With switch 94 in the position shown, the signal output of detector 80 is applied to the control electrode of tube 15 to energize the beam thereof periodically and produce on screen 16 minor scale divisions which represent different predetermined positions of the antenna directive pattern having a 1-degree spacing. Since the signals derived in detectors 78-80, inclusive, have repetition frequencies which are integrally related, detector 80 causes the beam of tube 15 to be energized when modulator 90 and its associated circuits deflect the beam radially to produce major scale divisions. The resulting vernier scale provided on screen 16 may be seen in Fig. 7. For convenience of illustration, the minor scale divisions which appear as small illuminated spots on the screen are represented by broken circular line 100. It will be understood that each major scale division is symmetrical about the circle of minor divisions but a suitable mask (not shown) placed around the screen will cause the scale to appear as represented.

For one rotation of antenna system 10, 11 switches 93, 94 apply the derived marker signals to cathode-ray tube 15 to provide on the screen thereof desired scale divisions. In alternate rotations of the antenna system, when switches 93 and 94 have rotated 180 degrees, the output signal of rectifier 23 is applied to cathode-ray tube 15 and twisting oscillator 61 is energized thereby to trace overlapping direction-finder patterns on the screen in response to a received signal. Since the tube has a long persistence screen, the direction-finder patterns are traced with reference to the scale divisions, whereby accurate indications of bearing of a received signal may be determined.

By way of a summary, it will be seen that, in accordance with the invention, an arrangement is provided for indicating the position of a reference characteristic movable in a predetermined pattern. For the embodiment disclosed in the drawings, the reference characteristic comprises the directive pattern of an antenna system movable in a circular path. The arrangement comprises means for supplying a signal, preferably oscillations, means dependent directly upon the rotation of the directive pattern for varying a characteristic of the oscillations in accordance therewith, preferably the phase thereof, means for deriving from the variations of the characteristic a marker signal which corresponds to a predetermined position of the directive pattern, and means for applying the derived marker signal to a line-tracing device.

It will be understood that the step-up gear train connecting secondary winding 68 with the rotating antenna may be omitted and the winding driven at the same frequency as the antenna. In such a case, a single marker signal will be derived through a comparison of the reference and comparative oscillations but a vernier indication scale may, nevertheless, be obtained through the use of suitable frequency-multiplication stages. In any case, it is desirable to provide an adjustment for varying the orientation of the primary and secondary elements of the inductive-coupling means with reference to antenna system 10, 11. These elements should be adjusted so that the reference and comparative oscillations have substantially identical phase when the antenna directive pattern is directed in a predetermined direction, for example, due north. Such an adjustment permits orienting the scale divisions produced on the line-tracing device with known positions of the antenna system.

It will be understood that an auxiliary oscillator having the same phase and frequency of reference oscillator 75 may, if desired, be utilized as a signal source in unit 77 for the purpose of comparing reference and comparative oscillations to derive desired marker signals. Furthermore, in producing major scale divisions on tube 15, the combined output signals of detectors 78 and 79 may be utilized to modulate the second anode potential of the tube. Modulation of the second anode voltage varies the electron velocity of the cathode-ray beam in tube 15 and enables the deflecting elements thereof to deflect the beam radially. Additionally, mechanical switches 93 and 94 may be replaced by any suitable form of switches, for example, electronic switches.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radiated-signal direction finder, an arrangement for indicating the position of a movable directive pattern comprising, a signal-radiation system having a directive pattern in space and including means for mechanically rotating at least a portion of said system to rotate said directive pattern, means for supplying oscillations, means including a rotatable element mechanically coupled to said first-mentioned means to be mechanically driven thereby for varying a characteristic of said oscillations in accordance with the position of said directive pattern in space, means for deriving from the variation of said characteristic a marker signal which represents a predetermined position of said directive pattern in space, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to indicate the direction of reception of said radiated signal.

2. In a radiated-signal direction finder, an arrangement for indicating the position of a movable directive pattern comprising, a signal-radiation system having a rotating directive pattern in space, means for supplying oscillations, means dependent directly upon the rotation of said directive pattern for varying the phase of said oscillations in accordance therewith, means for deriving from the phase variation of said oscillations a marker signal which represents a predetermined position of said directive pattern, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to indicate the direction of reception of said radiated signal.

3. In a radiated-signal direction finder, an arrangement for indicating the position of a movable directive pattern comprising, a signal-radiation system having a rotating directive pattern in space, means for supplying reference oscillations, means dependent directly upon the rotation of said directive pattern for varying the phase of said oscillations in accordance therewith to derive comparative oscillations, means for comparing said reference and comparative oscillations to derive a marker signal which represents a predetermined position of said directive pattern, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to indicate the direction of reception of said radiated signal.

4. In a radiated-signal direction finder, an arrangement for indicating the position of a movable directive pattern comprising, a signal-radiation system having a rotating directive pattern in space, means for supplying reference oscillations, means dependent directly upon the rotation of said directive pattern for varying the phase of said oscillations in accordance therewith to derive comparative oscillations, means for comparing said reference and comparative oscillations to derive a marker signal which represents a predetermined position of said directive pattern only when said reference and comparative oscillations have a predetermined phase relationship, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to indicate the direction of reception of said radiated signal.

5. In a radiated-signal direction finder, an arrangement for indicating the position of a movable directive pattern comprising, a signal-radiation system having a rotating directive pattern in space, means for supplying reference oscillations, impedance-coupling means including a primary element having at least two impedance members arranged in space-quadrature relation and a secondary element, means for rotating one of said elements in synchronism with the rotation of said directive pattern, means for supplying said reference oscillations in quadrature-phase relation to said impedance members thereby to induce in said secondary element comparative oscillations having a phase relation with respect to said reference oscillations which varies in accordance with the rotation of said directive pattern, means for deriving from said comparative oscillations a marker signal which represents a predetermined position of said directive pattern, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to provide an indication of the direction of said radiated signal.

6. In a radiated-signal direction finder, an arrangement for indicating the position of a movable directive pattern comprising, a signal-radiation system having a rotating directive pattern in space, means for supplying reference oscillations, inductive-coupling means including a primary element having at least two inductors arranged in space-quadrature relation and a secondary inductive element, means for rotating one of said elements in synchronism with the rotation of said directive pattern, means for supplying said reference oscillations in quadrature-phase relation to said inductors thereby to induce in said secondary element comparative oscillations having a phase relation with respect to said reference oscillations which varies in accordance with the rotation of said directive pattern, means for deriving from said comparative oscillations a marker signal which represents a predetermined position of said directive pattern, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to provide an indication of the direction of said radiated signal.

7. In a radiated-signal direction finder, an arrangement for indicating the position of a movable directive pattern comprising, a signal-radiation system having a rotating directive pattern in space, means for supplying reference oscillations, means dependent directly upon the rotation of said directive pattern for varying the phase of said oscillations in accordance therewith to derive comparative oscillations, means for combining said reference and comparative oscillations, means for differentiating the combined reference and comparative oscillations, amplitude-responsive means for deriving from the differentiated oscillations a marker signal which represents a predetermined position of said directive pattern, a line-tracing device, means for synchronizing said line-tracing device with the rotation of said directive pattern, means for applying said marker signal to said device to produce an indication of said predetermined position of said directive pattern, and means responsive to a radiated signal translated by said system for causing said device to produce an indication of said directive pattern with reference to said predetermined position of said directive pattern, thereby to provide an indication of the direction of said radiated signal.

8. An arrangement for indicating the position of a reference characteristic movable in a predetermined pattern comprising, means for supplying reference oscillations, means dependent directly upon the movement of said reference characteristic for varying the phase of said reference oscillations in accordance therewith at a frequency which is integrally related to the frequency of said movement to derive comparative oscillations, means for deriving from said comparative oscillations a succession of marker signals which individually represent different predetermined positions of said reference characteristic, a line-tracing device, means for synchronizing said line-tracing device with the movement of said reference characteristic, means for applying said succession of marker signals to said device to provide scale divisions corresponding to said predetermined positions, means for translating a signal dependent upon the position of said reference characteristic, and means for causing said device to indicate with respect to said scale the variation of said last-named signal in response to the motion of said reference characteristic.

9. An arrangement for indicating the position of a reference characteristic movable in a predetermined pattern comprising, means for supplying reference oscillations, means dependent directly upon the movement of said reference characteristic for varying the phase of said reference oscillations in accordance therewith to derive comparative oscillations, means for multiplying the frequency of at least one of said oscillations, means for effectively comparing the other of said oscillations with the multiplied-frequency oscillations to derive a succession of marker signals which individually represent different predetermined positions of said reference characteristic, a line-tracing device, means for synchronizing said line-tracing device with the movement of said reference characteristic, means for applying said succession of marker signals to said device to provide scale divisions corresponding to said predetermined positions, means for translating a signal dependent upon the position of said reference characteristic, and means for causing said device to indicate with respect to said scale the variation of said last-named signal in response to the motion of said reference characteristic.

10. An arrangement for indicating the position of a reference characteristic movable in a predetermined pattern comprising, means for supplying reference oscillations, means dependent directly upon the movement of said reference characteristic for varying the phase of said reference oscillations in accordance therewith to derive comparative oscillations, means for multiplying the frequency of said reference oscillations, means for effectively comparing the multiplied-frequency and comparative oscillations to derive a succession of marker signals which individually represent different predetermined positions of said reference characteristic, a line-tracing device, means for synchronizing said line-tracing device with the movement of said reference characteristic, means for applying said succession of marker signals to said device to provide scale divisions corresponding to said predetermined positions, means for translating a signal dependent upon the position of said reference characteristic, and means for causing said device to indicate with respect to said scale the variation of said last-named signal in response to the motion of said reference characteristic.

11. An arrangement for indicating the position of a reference characteristic movable in a predetermined pattern comprising, means for supplying reference oscillations, means dependent directly upon the movement of said reference characteristic for varying the phase of said reference oscillations in accordance therewith to derive comparative oscillations, means for multiplying the frequency of said reference and comparative oscillations, means for effectively comparing the reference and comparative oscillations of multiplied frequency to derive a succession of marker signals which individually represent different predetermined positions of said reference characteristic, a line-tracing device, means for synchronizing said line-tracing device with the movement of said reference characteristic, means for applying said succession of marker signals to said device to provide scale divisions corresponding to said predetermined positions, means for translating a signal dependent upon the position of said reference characteristic, and means for causing said device to indicate with respect to said scale the variation of said last-named signal in response to the motion of said reference characteristic.

12. An arrangement for indicating the position of a reference characteristic movable in a predetermined pattern comprising, means for supplying reference oscillations, means dependent directly upon the movement of said reference characteristic for varying the phase of said reference oscillations in accordance therewith at a frequency which is integrally related to the frequency of said movement to derive comparative oscillations, means for deriving from said comparative oscillations a first succession of marker signals having a predetermined repetition frequency and representing predetermined different positions of said reference characteristic, means for deriving from said comparative oscillations a second succession of marker signals having a repetition frequency harmonically related to said predetermined frequency and representing different predetermined positions of said reference characteristic, a line-tracing device, means for synchronizing said line-tracing device with the movement of said reference characteristic, means for applying said marker signals to said device to provide major and minor scale divisions corresponding to said first and second succession of signals, respectively, means for translating a signal dependent upon the position of said reference characteristic, and means for causing said device to indicate with respect to said scale the variation of said last-named signal in response to the motion of said reference characteristic.

13. An arrangement for indicating the position of a reference characteristic movable in a predetermined pattern comprising, means for supplying reference oscillations, means dependent directly upon the movement of said reference characteristic for varying the phase of said reference oscillations in accordance therewith at a frequency which is integrally related to the frequency of said movement to derive comparative oscillations, means for deriving from said comparative oscillations a first succession of marker signals having a predetermined repetition frequency and representing predetermined different positions of said reference characteristic, means for deriving from said comparative oscillations a second succession of marker signals having a repetition frequency harmonically related to said predetermined frequency and representing different predetermined positions of said reference characteristic, a cathode-ray tube line-tracing device including means for tracing a line with the cathode-ray beam of the tube, means for synchronizing said line-tracing device with the movement of said reference characteristic, means responsive to said first succession of marker signals for shifting the line traced by said device in accordance therewith to provide major scale divisions corresponding thereto, means responsive to said second succession of marker signals for modulating the intensity of said cathode-ray beam in accordance therewith to provide minor scale divisions corresponding thereto, means for translating a signal dependent upon the position of said reference characteristic, and means for causing said device to indicate with respect to said scale the variation of said last-named signal in response to the motion of said reference characteristic.

14. An arrangement for indicating the position of a rotating reference characteristic comprising, means dependent directly upon the rotation of said reference characteristic for deriving a succession of marker signals which individually represent different predetermined positions thereof, a line-tracing device having a persistent screen, means for synchronizing said line-tracing device with the rotation of said reference characteristic, means for applying said succession of marker signals to said device to provide scale divisions on said screen corresponding to said predetermined positions, means for translating a signal dependent upon the position of said reference characteristic, means for causing said device to indicate on said screen the variation of said last-named signal in response to the rotation of said reference characteristic, and means for causing said device to respond alternately to said succession of marker signals and to said last-named signal for predetermined cycles of rotation of said reference characteristic.

15. An arrangement for indicating the position of a rotating reference characteristic comprising, means dependent directly upon the rotation of said reference characteristic for deriving a succession of marker signals which individually represent different predetermined positions thereof, a line-tracing device having a persistent screen, means for synchronizing said line-tracing device with the rotation of said reference characteristic, means for applying said succession of marker signals to said device to provide scale divisions on said screen corresponding to said predetermined positions, means for translating a signal dependent upon the position of said reference characteristic, means for causing said device to indicate on said screen the variation of said last-named signal in response to the rotation of said reference characteristic, and switching means for causing said device to respond alternately to said succession of marker signals and to said last-named signal for predetermined cycles of rotation of said reference characteristic.

BERNARD D. LOUGHLIN.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,208,378 | Luck | July 16, 1940 |
| 2,233,275 | Wolff | Feb. 25, 1941 |
| 2,272,607 | Higonnett | Feb. 10, 1942 |

FOREIGN PATENTS

| Number | Country | Date |
| --- | --- | --- |
| 532,854 | Great Britain | Jan. 31, 1941 |